United States Patent
Sayed et al.

(10) Patent No.: US 10,422,212 B2
(45) Date of Patent: Sep. 24, 2019

(54) BOREHOLE TRAJECTORY VIA MULTI-COMPONENT BOREHOLE SEISMIC RECEIVER

(71) Applicant: Schlumberger Technology Corporation, Sugar Land, TX (US)

(72) Inventors: Ali Yawar Sayed, Katy, TX (US); Joel Herve Le Calvez, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/741,778

(22) PCT Filed: Jul. 4, 2016

(86) PCT No.: PCT/US2016/040919
§ 371 (c)(1),
(2) Date: Jan. 4, 2018

(87) PCT Pub. No.: WO2017/007738
PCT Pub. Date: Jan. 12, 2017

(65) Prior Publication Data
US 2018/0187542 A1     Jul. 5, 2018

Related U.S. Application Data

(60) Provisional application No. 62/188,691, filed on Jul. 5, 2015.

(51) Int. Cl.
*E21B 47/022* (2012.01)
*G01V 1/16* (2006.01)
(Continued)

(52) U.S. Cl.
CPC .......... *E21B 47/02208* (2013.01); *E21B 7/04* (2013.01); *E21B 47/091* (2013.01);
(Continued)

(58) Field of Classification Search
CPC .... E21B 47/02208; E21B 47/091; E21B 7/04; E21B 49/00; E21B 47/18; G01V 1/184;
(Continued)

(56) References Cited

U.S. PATENT DOCUMENTS 8,154,951 B2    4/2012  Armstrong
9,158,020 B2   10/2015  Eisner et al.
(Continued)

FOREIGN PATENT DOCUMENTS

WO    WO2000000786 A1    1/2000
WO    WO2015070022 A1    5/2015

OTHER PUBLICATIONS

International Preliminary report on patentability issued in the related PCT application PCT/US2016/040919, dated Jan. 9, 2018 (5 pages).
(Continued)

*Primary Examiner* — Daniel L Murphy
(74) *Attorney, Agent, or Firm* — Eileen Pape

(57) ABSTRACT

A method can include receiving an estimated spatial location of a three-component receiver in a borehole; receiving a plurality of spatial locations of sources of seismic energy; receiving incident angles for the three-component receiver at the estimated spatial location for the plurality of spatial locations of the sources of seismic energy; computing orientations for the three-component receiver based at least in part on the incident angles; minimizing an error function for the orientations; and, based at least in part on the minimizing, determining one or more deviation survey parameter values that specify at least a portion of a trajectory for the borehole.

18 Claims, 9 Drawing Sheets

(51) Int. Cl.
*G01V 1/18* (2006.01)
*G01V 1/42* (2006.01)
*G01V 1/50* (2006.01)
*E21B 47/09* (2012.01)
*E21B 7/04* (2006.01)
*E21B 49/00* (2006.01)
*G01V 1/52* (2006.01)
*E21B 47/18* (2012.01)

(52) U.S. Cl.
CPC .............. *E21B 49/00* (2013.01); *G01V 1/168* (2013.01); *G01V 1/184* (2013.01); *G01V 1/42* (2013.01); *G01V 1/50* (2013.01); *E21B 47/18* (2013.01); *G01V 1/52* (2013.01); *G01V 2200/16* (2013.01); *G01V 2210/121* (2013.01); *G01V 2210/1293* (2013.01); *G01V 2210/1295* (2013.01); *G01V 2210/1429* (2013.01)

(58) Field of Classification Search
CPC . G01V 1/42; G01V 1/50; G01V 1/168; G01V 1/52; G01V 2210/1295; G01V 2210/1429; G01V 2210/1293; G01V 2200/16; G01V 2210/121
USPC .......................................................... 367/35
See application file for complete search history.

(56) References Cited

U.S. PATENT DOCUMENTS

2010/0226207 A1   9/2010   Armstrong
2012/0046871 A1   2/2012   Naville et al.

OTHER PUBLICATIONS

Becquey and Dubesset, Three-Component Sonde Orientation in a Deviated Well, Geophysics, vol. 55, No. 10, Oct. 1990, pp. 1386-1388.
International Search Report and written opinion issued in the related PCT application PCT/US2016/040919, dated Sep. 20, 2016 (9 pages).

BOREHOLE TRAJECTORY VIA MULTI-COMPONENT BOREHOLE SEISMIC RECEIVER

CROSS-REFERENCE TO RELATED APPLICATION

The present document is based on and claims priority to U.S. Provisional Application Ser. No. 62/188,691, filed Jul. 5, 2015, which is incorporated herein by reference in its entirety.

BACKGROUND

A borehole may be a bore of a well (e.g., a wellbore), which may be cased, uncased, etc. A borehole may be characterized by its size and defined by a medium or media that surrounds the borehole. For example, a borehole may be formed by drilling into rock where a rock face defines the drilled hole (e.g., the borehole). As an example, a borehole may be formed directionally, for example, via a technique such as directional drilling. A directionally drilled borehole may deviate from vertical along one or more portions of the borehole. For example, a portion of a borehole may be drilled intentionally at an angle other than vertical. Horizontal drilling, as a subset of directional drilling, may refer to drilling that results in a departure of a borehole from vertical, for example, exceeding about 80 degrees. As an example, a horizontal borehole may, for example, after reaching about 90 degrees horizontal (e.g., as measured from vertical), deviate upward. In such cases, the angle past 90 degrees may be continued (e.g., as in 95 degrees, rather than reporting it as deviation from vertical, which would then be 85 degrees).

SUMMARY

A method can include receiving an estimated spatial location of a three-component receiver in a borehole; receiving a plurality of spatial locations of sources of seismic energy; receiving incident angles for the three-component receiver at the estimated spatial location for the plurality of spatial locations of the sources of seismic energy; computing orientations for the three-component receiver based at least in part on the incident angles; minimizing an error function for the orientations; and, based at least in part on the minimizing, determining one or more deviation survey parameter values that specify at least a portion of a trajectory for the borehole. A system can include a processor; memory operatively coupled to the processor; and processor-executable instructions stored in the memory to instruct the system to: receive an estimated spatial location of a three-component receiver in a borehole; receive a plurality of spatial locations of sources of seismic energy; receive incident angles for the three-component receiver at the estimated spatial location for the plurality of spatial locations of the sources of seismic energy; compute orientations for the three-component receiver based at least in part on the incident angles; minimize an error function for the orientations; and, based at least in part on a minimized error function, determine one or more deviation survey parameter values that specify at least a portion of a trajectory for the borehole. One or more computer-readable storage media can include processor-executable instructions to instruct a computing system to: receive an estimated spatial location of a three-component receiver in a borehole; receive a plurality of spatial locations of sources of seismic energy; receive incident angles for the three-component receiver at the estimated spatial location for the plurality of spatial locations of the sources of seismic energy; compute orientations for the three-component receiver based at least in part on the incident angles; minimize an error function for the orientations; and, based at least in part on a minimized error function, determine one or more deviation survey parameter values that specify at least a portion of a trajectory for the borehole. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
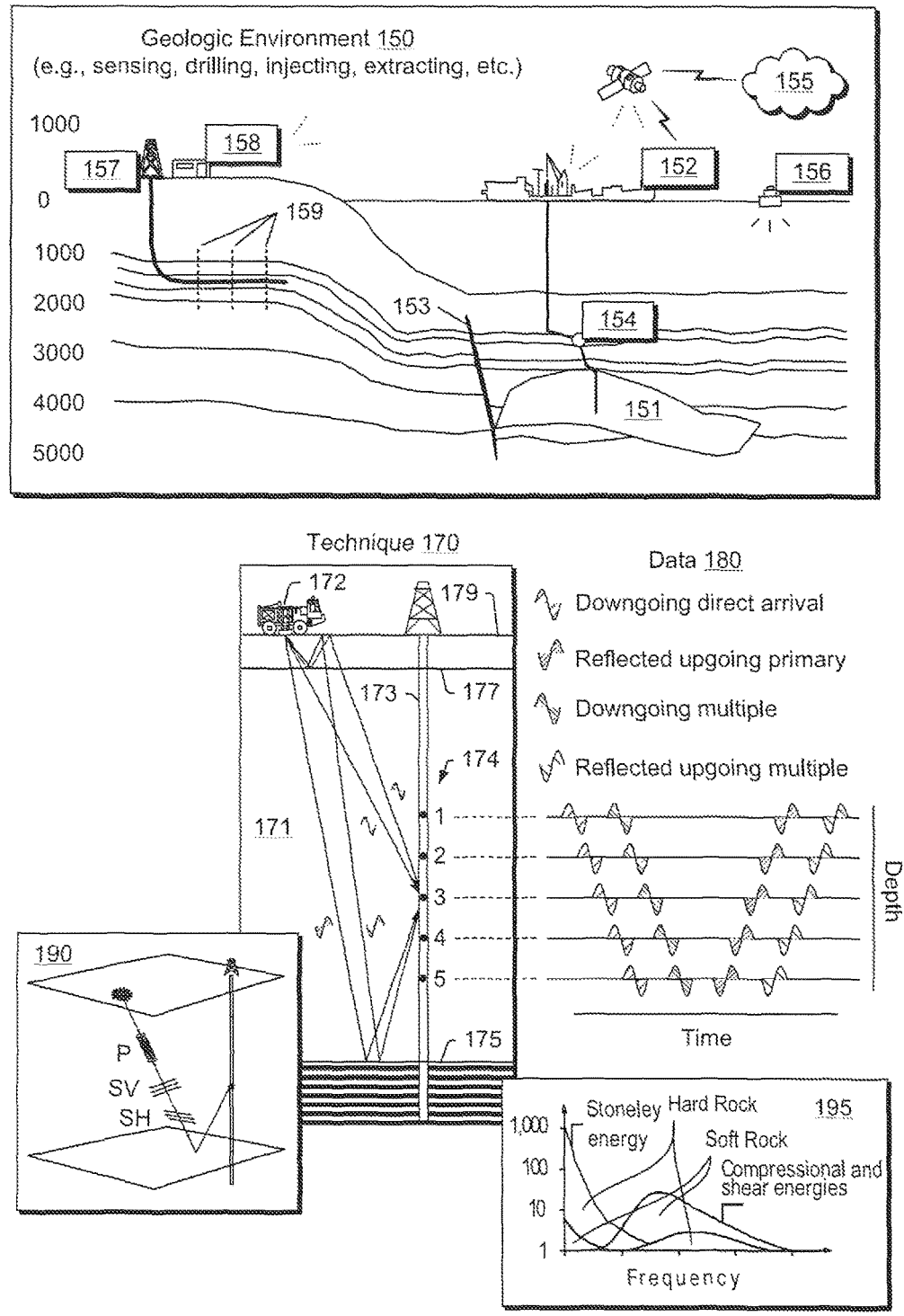
FIG. 1 illustrates an example of a geologic environment and an example of a technique.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, a borehole may be a bore of a well (e.g., a wellbore), which may be cased, uncased, etc. A borehole may be characterized by its size and defined by a medium or media that surrounds the borehole. For example, a borehole may be formed by drilling into rock where a rock face defines the drilled hole (e.g., the borehole). As an example, a borehole may be formed directionally, for example, via a technique such as directional drilling. A directionally drilled borehole may deviate from vertical along one or more portions of the borehole. For example, a portion of a borehole may be drilled intentionally at an angle other than vertical. Horizontal drilling, as a subset of directional drilling, may refer to drilling that results in a departure of a borehole from vertical, for example, exceeding about 80 degrees. As an example, a horizontal borehole may, for example, after reaching about 90 degrees horizontal (e.g., as measured from vertical), deviate upward. In such cases, the angle past 90 degrees may be continued (e.g., as in 95 degrees, rather than reporting it as deviation from vertical, which would then be 85 degrees).

As an example, a method may implement seismology to estimate spatial characteristics of a borehole. For example, a receiver may be disposed in the borehole and multiple sources fired (e.g., individually) such that compressional energy is recorded by the receiver (e.g., in three directions). Such recorded energy may be stored and/or communicated as waveforms where analysis of the waveforms can provide information as to spatial characteristics of the borehole.

As an example, a method may aim to refine existing spatial characteristics of the borehole. For example, consider a method that includes receiving an initial deviation survey for a borehole and then acquiring waveforms via a receiver in the borehole responsive to firing a plurality of sources. Such a method may analyze the waveforms to refine (e.g., increase accuracy) of the initial deviation survey. As an example, such a method, or one or more portions thereof, may be repeated to refine one or more parameters of a deviation survey.

Seismology finds use in geophysics, for example, to estimate properties of subsurface formations. As an example, seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. As an example, a receiver may operate at a frequency, over a range of frequencies, etc.

As an example, a receiver may operate according to a Nyquist condition or conditions (e.g., a Nyquist frequency or frequencies). For example, to reduce risk of aliasing, individual constituent frequencies may be sampled at least two times per wavelength. A Nyquist frequency can be defined as half of the sampling frequency of a digital recording system. As an example, a receiver may sample at about 1000 Hz (e.g., one sample per ms), at about 500 Hz (e.g., one sample per 2 ms), at about 250 Hz (e.g., one sample per 4 ms), etc.

As an example, a method can include acquiring seismic data using a receiver in a borehole to determine one or more spatial characteristics of the borehole. In such an example, the method may be applied to a geologic environment using sources disposed in/on land and/or may be applied to a geologic environment using sources disposed in/on water. For example, a method may be applied to a borehole with a land surface opening and/or to a borehole with a subsea "opening" (e.g., as may be fit with appropriate subsea equipment, etc.). As an example, a source may be positioned on or near a sea bed (e.g., beneath the surface of water, on a sea bed surface, between a sea bed surface and a surface of water, etc.). As an example, a source may be positioned in a borehole. As an example, a borehole may be a land-based borehole or a sea bed borehole. As an example, positions of sources may be one or more of land-based and sea-based.

FIG. 1 shows an example of a geologic environment 150 (e.g., an environment that includes a sedimentary basin, a reservoir 151, one or more fractures 153, etc.) and an example of an acquisition technique 170 to acquire seismic data. As an example, a system may process data acquired by the technique 170, for example, to allow for direct or indirect management of sensing, drilling, injecting, extracting, etc., with respect to the geologic environment 150. In turn, further information about the geologic environment 150 may become available as feedback (e.g., optionally as input to the system).

As an example, a system may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 150 may include layers (e.g., stratification) that include a reservoir 151 and that may be intersected by a fault 153. As an example, a geologic environment may be or include an offshore geologic environment, a seabed geologic environment, an ocean bed geologic environment, etc.

As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

In FIG. 1, the technique 170 may be implemented with respect to a geologic environment 171. As shown, an energy source (e.g., a transmitter) 172 may emit energy where the energy travels as waves that interact with the geologic environment 171. As an example, the geologic environment 171 may include a bore 173 (e.g., a borehole) where one or more sensors (e.g., receivers) 174 may be positioned in the bore 173. As an example, energy emitted by the energy source 172 may interact with a layer (e.g., a structure, an interface, etc.) 175 in the geologic environment 171 such that a portion of the energy is reflected, which may then be sensed by one or more of the sensors 174. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 171 is shown as including a layer 177 that resides below a surface layer 179. Given such an environment and arrangement of the source 172 and the one or more sensors 174, energy may be sensed as being associated with particular types of waves.

As shown in FIG. 1, acquired data 180 can include data associated with downgoing direct arrival waves (e.g., first direct arrival waves, first arrival waves, first direct waves, etc.), reflected upgoing primary waves, downgoing multiple reflected waves and reflected upgoing multiple reflected waves. The acquired data 180 is also shown along a time axis and a depth axis. As indicated, in a manner dependent at least in part on characteristics of media in the geologic environment 171, waves travel at velocities over distances such that relationships may exist between time and space. Thus, time information, as associated with sensed energy, may allow for understanding spatial relations of layers, interfaces, structures, etc. in a geologic environment.

FIG. 1 also shows a plot 190 of various types of waves as including P, SV an SH waves. As an example, a P-wave may be an elastic body wave or sound wave in which particles oscillate in the direction the wave propagates and may be referred to as a compressional wave (e.g., compressional energy). As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). FIG. 1 also shows a plot 195 of approximate amplitudes (e.g., in millivolts for a particular type of receiver) and frequencies for various types of energy and approximate types of rock (e.g., "hard" rock and "soft" rock).

As an example, a source may be, for example, a horizontal vibroseis source. As an example, an airgun source and/or a dynamite source may generate shear waves depending on surface conditions. As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters $\varepsilon$, $\delta$ and $\gamma$. The Thomsen parameter $\delta$ can be interpreted as describing depth (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ involves access to additional information.

As an example, seismic data may be acquired for a region in the form of traces. As an example, a trace may include a waveform (e.g., values of amplitude of energy versus time), for example, as sampled via a receiver. In the example of FIG. 1, the technique 170 may include the source 172 for emitting energy where portions of such energy (e.g., directly and/or reflected) may be received via the one or more sensors 174. As an example, energy received may be discretized by an analog-to-digital converter that operates at a sampling rate that may output values at a sample output rate (e.g., a sample output rate may differ from a sampling rate). For example, acquisition equipment may convert energy signals sensed by a sensor to digital samples at a rate of one sample per approximately 4 ms (e.g., for purposes of storage, transmission, etc.); noting that such an example may correspond to a sampling rate of about 250 Hz (e.g., about $(0.004\ s)^{-1}$). Given a speed of sound in a medium or media, a sample output rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sample output rate of one sample at about 4 ms intervals, such a trace would include about 1000 sample values where latter acquired sample values correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
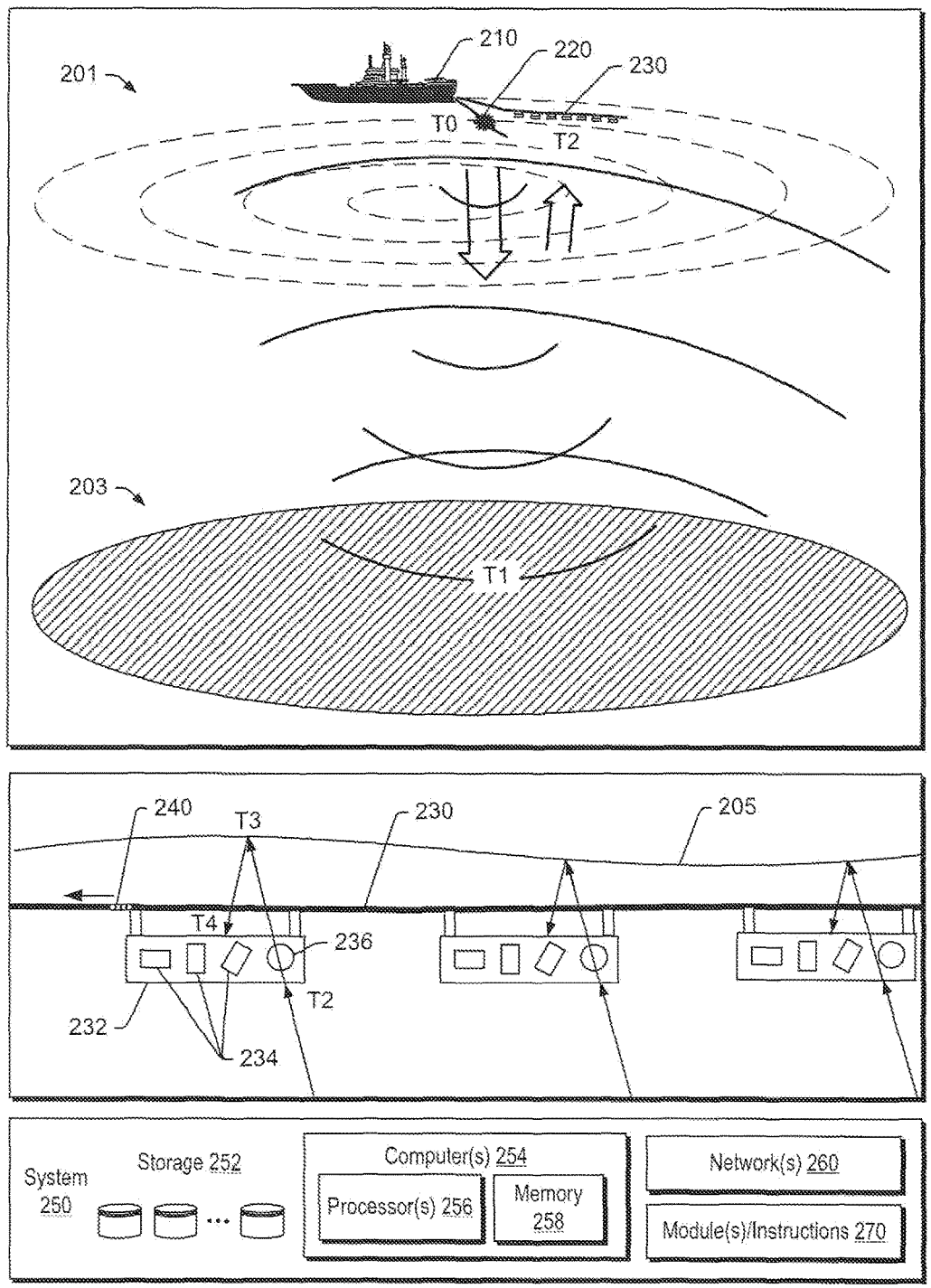
FIG. 2 illustrates an example of a geologic environment and examples of equipment.

FIG. 2 shows an example of a geologic environment 201 that includes a seabed 203 and a sea surface 205. As shown, equipment 210 such as a ship may tow an energy source 220 and a string of sensors 230 at a depth below the sea surface 205. In such an example, the energy source 220 may emit energy at a time T0, a portion of that energy may be reflected from the seabed 203 at a time T1 and a portion of that reflected energy may be received at the string of sensors 230 at a time T2.

As mentioned with respect to the technique 170 of FIG. 1, a wave may be a primary or a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (e.g., due to sub-seabed reflections, etc.).

As an example, each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 180 of FIG. 1 and data 240 of FIG. 2). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 205 (e.g., arrival times T2 and T4 may be relatively close). As an example, the sea surface 205 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 232 may include at least one geophone 234 and a hydrophone 236. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 2, the at least one geophone 234 can provide for motion detection and the hydrophone 236 can provide for pressure detection. As an example, the data 240 (e.g., analog and/or digital) may be transmitted via equipment, for example, for processing, etc.

As an example, a method may include analysis of hydrophone response and vertical geophone response, which may help to improve a PZ summation, for example, by reducing receiver ghost and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 2, the equipment 210 may include a system such as the system 250. As shown in FIG. 2, the system 250 includes one or more information storage devices 252, one or more computers 254, one or more network interfaces 260 and one or more modules 270 (e.g., instructions that include executable instructions). As to the one or more computers 254, each computer may include one or more processors (e.g., or processing cores) 256 and memory 258 for storing instructions (e.g., optionally per the module(s)/instructions 270), for example, executable by at least one of the one or more processors. As an example, a computer may include one or more network interfaces (e.g., wired or wireless), one or more graphics cards, a display interface (e.g., wired or wireless), etc. As an example, a method can include rendering information to a display, for example, via circuitry (e.g., of a computing system, etc.).

As an example, a method can include rendering one or more parameters, paths, etc. associated with a deviation survey of a borehole in a geologic environment to a display, for example, optionally during processing of data that may act to refine a deviation survey. Such an example, may optionally be implemented while drilling, for example, to allow an operator to more particularly guide a drilling operation, to allow a controller to more particularly control a drilling operation, etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 250 may receive P and Z data via one or more of the one or more network interfaces 260 and process such data, for example, via execution of instructions stored in the memory 258 by the processor 256. As an example, the system 250 may store raw and/or processed data in one or more of the one or more information storage devices 252.

Figure 3:
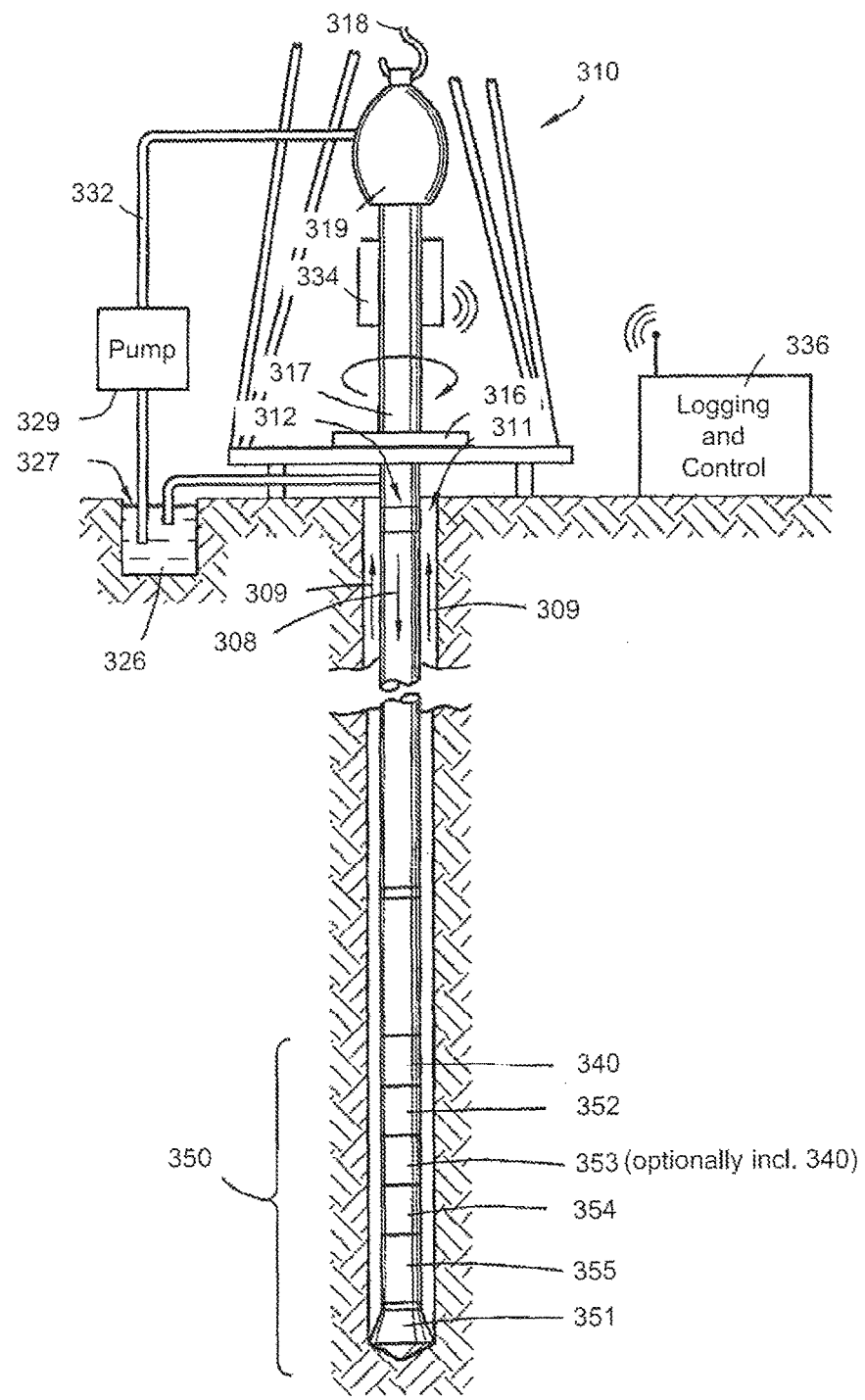
FIG. 3 illustrates an example of a geologic environment and examples of equipment.

FIG. 3 shows a wellsite system (e.g., at a wellsite that may be onshore or offshore). In the example system of FIG. 3, a borehole 311 is formed in subsurface formations by rotary drilling; noting that various example embodiments may also use directional drilling. As shown, a drill string 312 is suspended within the borehole 311 and has a bottom hole assembly 350 that includes a drill bit 351 at its lower end. A surface system provides for operation of the drill string 312 and other operations and includes platform and derrick assembly 310 positioned over the borehole 311, the assembly 310 including a rotary table 316, a kelly 317, a hook 318 and a rotary swivel 319. As indicated by an arrow, the drill string 312 can be rotated by the rotary table 316, energized by means not shown, which engages the kelly 317 at the upper end of the drill string 312. The drill string 312 is suspended from a hook 318, attached to a traveling block (not shown), through the kelly 217 and a rotary swivel 319 which permits rotation of the drill string 312 relative to the hook 318. As an example, a top drive system may be suitably used.

In the example of FIG. 3, the surface system further includes drilling fluid (e.g., mud, etc.) 326 stored in a pit 327 formed at the wellsite. As an example, a wellbore may be drilled to produce fluid, inject fluid or both (e.g., hydrocarbons, minerals, water, etc.). In the example of FIG. 3, the drill string 312 (e.g., including one or more downhole tools) may be composed of a series of pipes threadably connected together to form a long tube with the drill bit 351 at the lower end thereof. As the drill tool 312 is advanced into a wellbore for drilling, at some point in time prior to or coincident with drilling, the drilling fluid 326 may be pumped by a pump 329 from the pit 327 (e.g., or other source) via a line 232 to a port in the swivel 319 to a passage (e.g., or passages) in the drill string 312 and out of ports located on the drill bit 351 (see, e.g., a directional arrow 308). As the drilling fluid 226 exits the drill string 312 via ports in the drill bit 351, it then circulates upwardly through an annular region between an outer surface(s) of the drill string 312 and surrounding wall(s) (e.g., open borehole, casing, etc.), as indicated by directional arrows 309. In such a manner, the drilling fluid 326 lubricates the drill bit 351 and carries heat energy (e.g., frictional or other energy) and formation cuttings to the surface where the drilling fluid 326 (e.g., and cuttings) may be returned to the pit 327, for example, for recirculation (e.g., with processing to remove cuttings, etc.).

The drilling fluid 326 pumped by the pump 329 into the drill string 312 may, after exiting the drill string 312, form a mudcake that lines the wellbore which, among other functions, may reduce friction between the drill string 312 and surrounding wall(s) (e.g., borehole, casing, etc.). A reduction in friction may facilitate advancing or retracting the drill string 312. During a drilling operation, the entire drill string 312 may be pulled from a wellbore and optionally replaced, for example, with a new or sharpened drill bit, a smaller diameter drill string, etc. The act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 351 of the drill string 312 at a bottom of a wellbore, pumping of the drilling fluid 326 commences to lubricate the drill bit 351 for purposes of drilling to enlarge the wellbore. As mentioned, the drilling fluid 326 is pumped by pump 329 into a passage of the drill string 312 and, upon filling of the passage, the drilling fluid 326 may be used as a transmission medium to transmit energy, for example, energy that may encode information as in mud-pulse telemetry.

As an example, mud-pulse telemetry equipment may include a downhole device configured to effect changes in pressure in the drilling fluid 326 to create an acoustic wave or waves upon which information may modulated. In such an example, information from downhole equipment (e.g., one or more modules of the drill string 312) may be transmitted uphole to an uphole device 334, which may relay such information to other equipment 336 for processing, control, etc.

As an example, the drill string 312 may be fitted with telemetry equipment 340 that may include a rotatable drive shaft, a turbine impeller mechanically coupled to the drive shaft such that the drilling fluid 326 can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the drilling fluid 326, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the drilling fluid 326. In the example of FIG. 3, the uphole device 334 may include circuitry to sense pressure pulses generated by telemetry equipment 340 and, for example, communicate sensed pressure pulses or information derived therefrom to the equipment 336 for process, control, etc.

The bottom hole assembly 350 (BHA) of the illustrated embodiment includes a logging-while-drilling (LWD) module 352, a measuring-while-drilling (MWD) module 353, an optional module 354, a roto-steerable system and motor 355, and the drill bit 351.

The LWD module 352 may be housed in a suitable type of drill collar and can contain one or a plurality of selected types of logging tools. It will also be understood that more than one LWD and/or MWD module can be employed, for example, as represented at by the module 354 of the drill string 312. Where the position of an LWD module is mentioned, as an example, it may refer to a module at the position of the LWD module 352, the module 354, etc. An LWD module can include capabilities for measuring, processing, and storing information, as well as for communicating with the surface equipment. In the illustrated example embodiment of FIG. 3, the LWD module 352 may include a seismic measuring device.

The MWD module 353 may be housed in a suitable type of drill collar and can contain one or more devices for measuring characteristics of the drill string 312 and drill bit 351. As an example, the MWD tool 353 may include equipment for generating electrical power, for example, to power various components of the drill string 312. As an example, the MWD tool 353 may include the telemetry equipment 340, for example, where the turbine impeller can generate power by flow of the drilling fluid 326; it being understood that other power and/or battery systems may be employed for purposes of powering various components. As an example, the MWD module 353 may include one or more of the following types of measuring devices: a weight-on-bit measuring device, a torque measuring device, a vibration measuring device, a shock measuring device, a stick slip measuring device, a direction measuring device, and an inclination measuring device.

Figure 4:
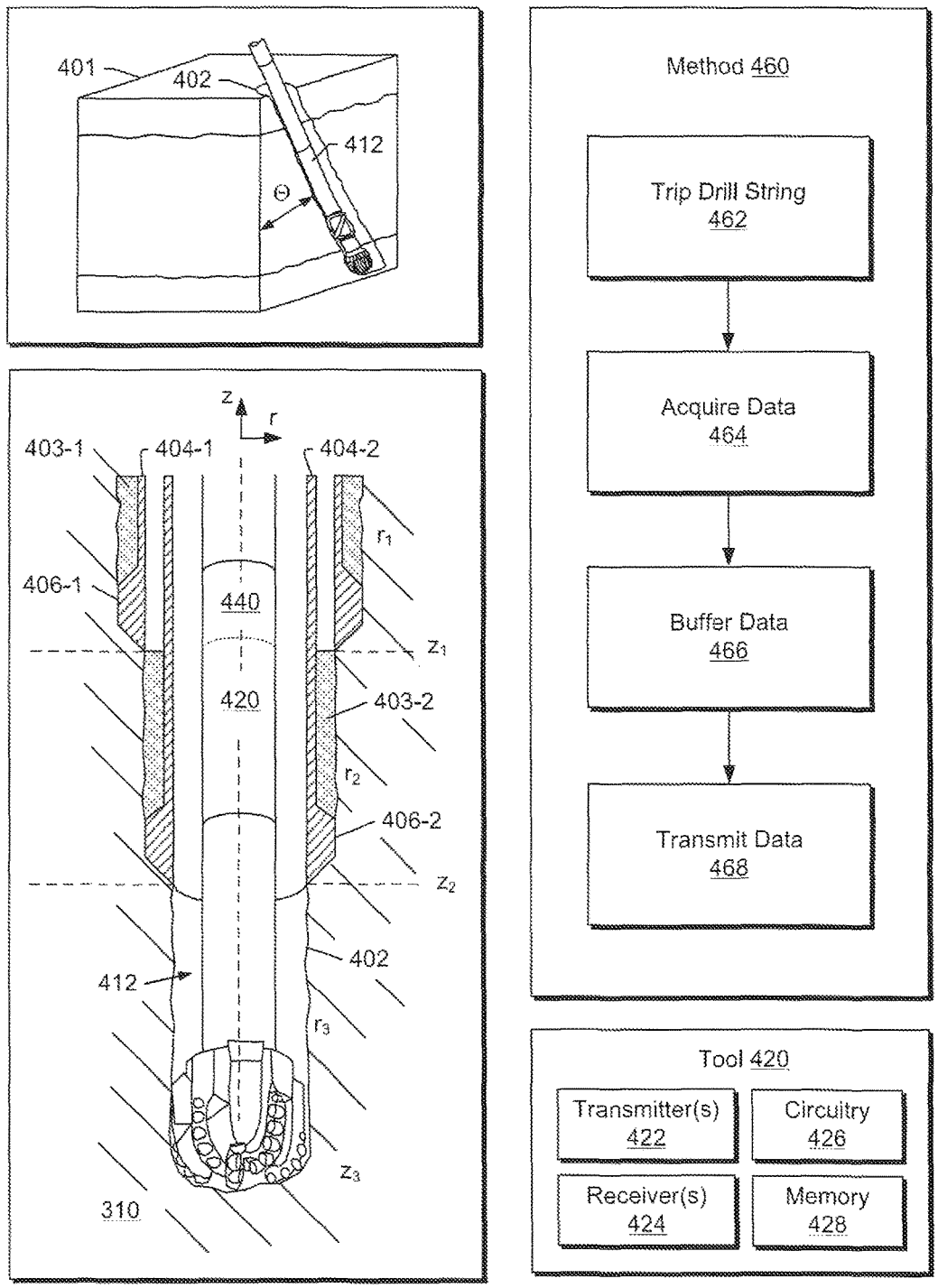
FIG. 4 illustrates an example of a geologic environment, examples of equipment and an example of a method.

FIG. 4 illustrates an example of a system 410 that includes a drill string 412 with a tool (or module) 420 and telemetry equipment 440 (e.g., which may be part of the tool 420 or another tool) and an example of a method 460 that may be implemented using the system 410. In the example of FIG. 4, the system 410 is illustrated with respect to a wellbore 402 (e.g., a borehole) in a portion of a subterranean formation 401 (e.g., a sedimentary basin). The wellbore 402 may be defined in part by an angle (Θ), noting that while the wellbore 402 is shown as being deviated, it may be vertical (e.g., or include one or more vertical sections along with one or more deviated sections, which may be, for example, lateral, horizontal, etc.).

As shown in an enlarged view with respect to an r, z coordinate system (e.g., a cylindrical coordinate system), a portion of the wellbore 402 includes casings 404-1 and 404-2 having casing shoes 406-1 and 406-2. As shown, cement annuli 403-1 and 403-2 are disposed between the wellbore 402 and the casings 404-1 and 404-2. Cement such as the cement annuli 403-1 and 403-2 can support and protect casings such as the casings 404-1 and 404-2 and when cement is disposed throughout various portions of a wellbore such as the wellbore 402, cement can help achieve zonal isolation.

In the example of FIG. 4, the wellbore 402 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about X thousand feet and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a lumen of the casing.

Referring again to the tool 420 of FIG. 4, it may carry one or more transmitters 422 and one or more receivers 424. In the example of FIG. 4, the tool 420 includes circuitry 426 and a memory device 428 with memory for storage of data (e.g., information), for example, signals sensed by one or more receivers 424 and processed by the circuitry 426 of the tool 420. As an example, the tool 420 may buffer data to the memory device 428. As an example, data buffered in the memory device 428 may be read from the memory device 428 and transmitted to a remote device using a telemetry technique (e.g., wired, wireless, etc.).

As an example, a drilling operation may implement a directional driller (e.g., directional drilling equipment, etc.). As an example, directional drilling may include adjusting one or more drilling parameters such as weight on bit and rotary speed to deflect the bit away from an axis of the existing borehole. A directional drilling operation may aim to point a drill bit in a desired direction (e.g., according to a drilling plan, etc.). As an example, a drill string may include a bend near the drill bit in a downhole steerable mud motor. In such an example, the bend can point the drill bit in a direction different from the axis of the borehole (e.g., when the drill string is not rotating). As an example, by pumping mud through a mud motor, the drill bit can turn while the drill string does not rotate, allowing the drill bit to drill in the direction it points. When a particular direction is achieved, that direction may be maintained by rotating the entire drill string (e.g., including the bent section) so that the drill bit does not drill in a single direction off the wellbore axis, but instead sweeps around and its net direction coincides with the existing borehole. As an example, a drilling operation may implement one or more rotary steerable tools that can allow steering while rotating, which may, for example, achieve suitable rates of penetration and a smoother borehole. Directional drilling may be applied in various types of geologic environments. For example, directional drilling may be applied in shale reservoir environment as it may allow drillers to place a borehole in contact with productive reservoir rock (e.g., consider horizontal wells, etc.).

Directional drilling can allow hydrocarbon prospectors to drill relatively complex borehole trajectories. Some challenges that may benefit from directional drilling can include: tap reservoirs that may not have suitable drilling locations vertically; geo-hazards avoidance to avoid features such as faults, rubble zone, gas pockets, etc.; relief well drilling (e.g., to control an uncontrolled well); intersection of multiple geophysical targets with a single well trajectory; increase reservoir contact by drilling within a zone; and drilling multiple wells from a common surface well pad.

During a drilling operation, measured depth (MD), inclination, and azimuth of a borehole may be measured at regular intervals, for example, to construct a deviation survey. As an example, a deviation survey can used to compute an approximate borehole trajectory. Measurement errors within the deviation survey can lead to uncertainty in actual location of a borehole trajectory.

As prospector may benefit from increased precision as to locations, shape, positions, etc., of a borehole (e.g., of a borehole trajectory). For example, increased precision may help to determine whether pre-drill geophysical targets were successfully intersected by a borehole trajectory, may help to correlate borehole measurements to surface geophysical data and/or structural and stratigraphic interpretation, may help to design and drill offset or parallel borehole trajectories for effectively draining a reservoir, may help to drill one or more relief wells to intersect an existing well, may help to acquire surface-to-borehole or borehole-to-borehole measurements such as vertical seismic profiling (VSP), microseismic monitoring (e.g., for hydraulic fracturing, etc.), or crosswell profiling.

As an example, a method can include utilizing orientation of a three-component seismic receiver in borehole, for example, as computed by a plurality of sources from known locations. Such a method may help to more accurately determine one or more deviation survey parameters of a borehole at the receiver. As an example, a method may be extended to improve one or more deviation survey parameters across one or more portions of a borehole (e.g., consider substantially an entire well), for example, by reacquiring data from multiple source positions into a/an single/array of three-component seismic receiver(s) that may be sequentially moved along the borehole trajectory.

As an example, a measurement while drilling technique (MWD) may be performed to determine a deviation survey.

In such an example, the drill string is measured as it is fed into the borehole to determine the depth along the borehole, also referred to as measured depth (MD). In such an example, sensors in the drill string can be used to measure inclination and azimuth at regular intervals within the borehole. As an example, station measurements of measured depth, inclination, and azimuth can form a deviation survey. Such a deviation survey may be used to geometrically compute the well trajectory in three dimensional space. However, deviation surveys can be prone to measurement errors that result in a cone of uncertainty (COU) along a borehole trajectory.

As an example, consider measurement errors such as the length of the drill string being influenced by temperature and compressive or tensile forces on the drill string (e.g., consider measured depth errors of the order of about 2 ft per 1000 ft) where error can increase with increasing inclination); azimuth measurement can be influenced by magnetic interference from the drill string, near-by wells, casing, and natural magnetism of the subsurface rocks where azimuth error can be of the order of a few degrees, which can vary with inclination and azimuth of the borehole; and inclination measurement can be influenced by survey tool misalignment and sag in a drill string where inclination error can be of the order of about 1 degree at high inclination angles. Such measurement errors can be non-linear and not amenable to adjustments in their precision, accuracy, etc.

As an example, one or more gyroscope sensors may be lowered in a borehole, for example, with the help of a wireline cable to create a deviation survey. So-called gyro surveys also suffer from inherent measurement errors, such as accelerometer biases and sensor misalignment errors.

As an example, a method can include utilizing one or more stationary three-component receivers, for example, anchored within a candidate borehole to record energy from multiple sources (e.g., active seismic (VSP, walk-away, etc.) or passive seismic (e.g., microseismic events, etc.)) at known spatial locations. For example, the first arrival of direct compressional energy incident on a three component receiver can be analyzed to determine spatial direction of incoming energy. In such an example, the compressional arrival can be assumed to be substantially polarized within a vertical plane that includes the source and the receiver.

Figure 5:
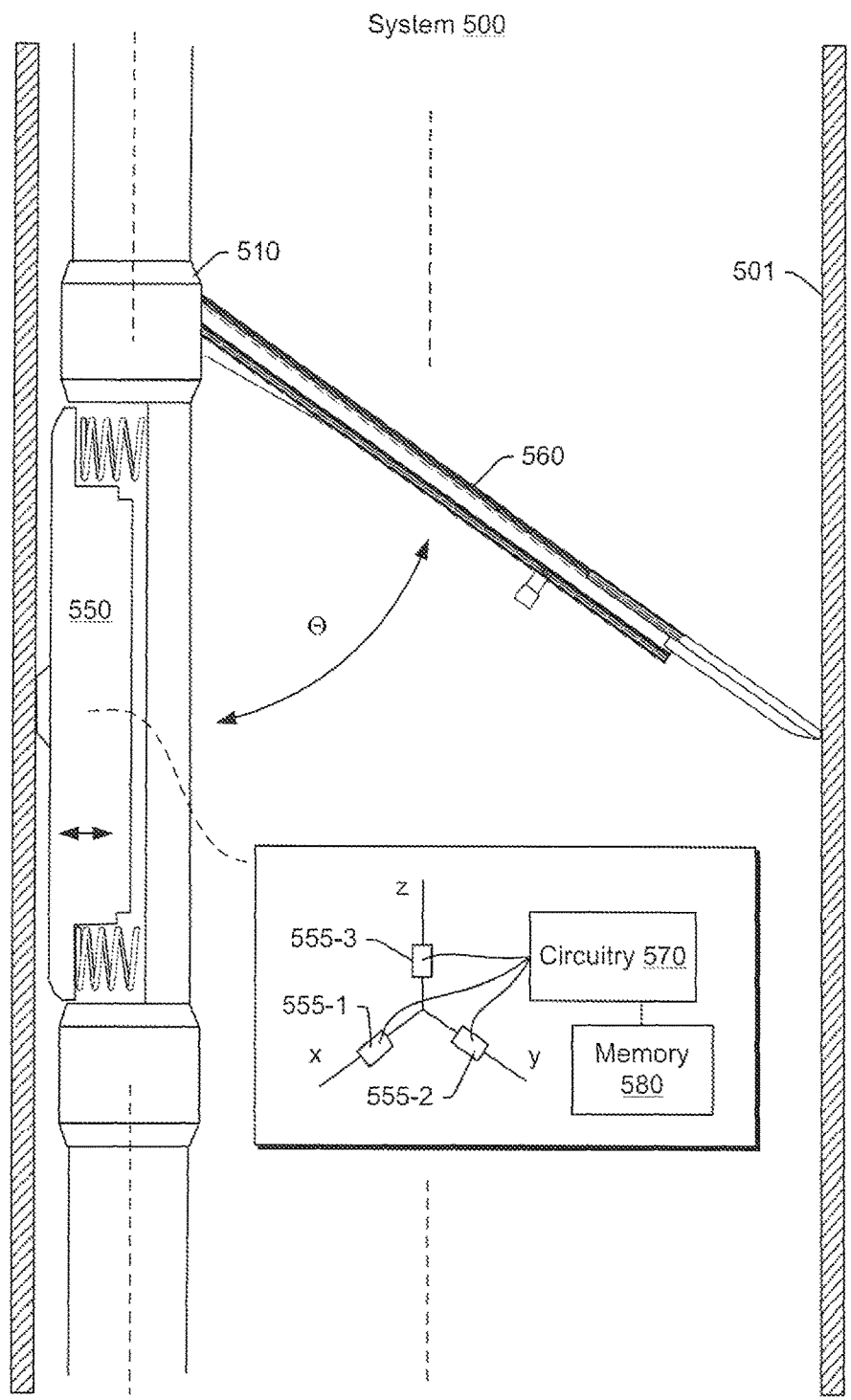
FIG. 5 illustrates an example of a system that includes at least one receiver.

FIG. 5 shows an example of a system 500 with respect to a borehole 501 where the system 500 includes a tool body 510, a receiver assembly 550 and a caliper 560. As shown, the receiver assembly 550 may be relatively "de-coupled" from the tool body 510 for purposes of acoustic isolation and/or noise suppression. The caliper 560, shown extended, can positively anchor the receiver assembly 550, for example, to reduce signal distortion. Such a system may be implemented, for example, in openhole, cased boreholes, etc. As shown in the example of FIG. 5, the caliper 560 is extended at an angle Θ as measured from a longitudinal axis of the tool body 510 (see dashed line of the tool body 510 as may be offset from a longitudinal axis of the borehole 501, also represented by a dashed line). As an example, such an angle may be lesser or greater depending on one or more dimensions of a borehole. As shown in the example of FIG. 5, the receiver assembly may translate radially outwardly from the longitudinal axis of the tool body 510. As an example, the tool body 510 may be located at least in part via the receiver assembly 550 and the caliper 560. As an example, such components can be controllable, for example, actuatable via one or more signals.

In the example of FIG. 5, the receiver assembly 550 is shown as including three accelerometers 555-1, 555-2 and 555-3 that are operatively coupled to circuitry 570, which may, for example, be operatively coupled to memory 580 (e.g., for storing one or more of instructions, data, etc.). As an example, the circuitry 570 may include digitization circuitry (e.g., one or more analog-to-digital converters) and other circuitry. For example, analog signals from the accelerometers 555-1, 555-2 and 555-3 may be digitized by the circuitry 570 and optionally stored in the memory 580 (e.g., as digital data). As an example, the receiver assembly 550 may sense seismic energy and store and/or output seismic waveforms based at least in part on sensed seismic energy. As an example, the circuitry 570 can optionally include a processor that can process information (e.g., data, etc.) locally (e.g., local to the receiver assembly 550 or the tool body 510.

As an example, the system 500 can include one or more features of the VERSATILE SEISMIC IMAGER™ (VSI) tool marketed by Schlumberger Limited (Houston, Tex.). The VSI tool can enable flexibility in shuttle spacing on logging cable for acquiring three-component (3C) borehole seismic data. The acoustically isolated seismic sensor package features 3C omni-tilt geophone accelerometers, with the sensors decoupled from the tool body, for measuring particle motion (e.g., of a formation). The VSI tool includes digitization circuitry physically close to the sensor package, which may reduce signal distortion, for example, by removing tool harmonic noise and tube waves from the borehole-seismic band. As an example, a three-component receiver may include receiver circuitry that can provide for a 20 Hz flat bandwidth in acceleration: 2-200 Hz; and, for example, a 24-bit analog to digital converter. As an example, a receiver may include circuitry that can provide a sampling rate such as, for example, 1 ms (e.g., about 1000 Hz), 2 ms (e.g., about 500 Hz), 4 ms (e.g., about 250 Hz) and/or another suitable rate.

Figure 6:
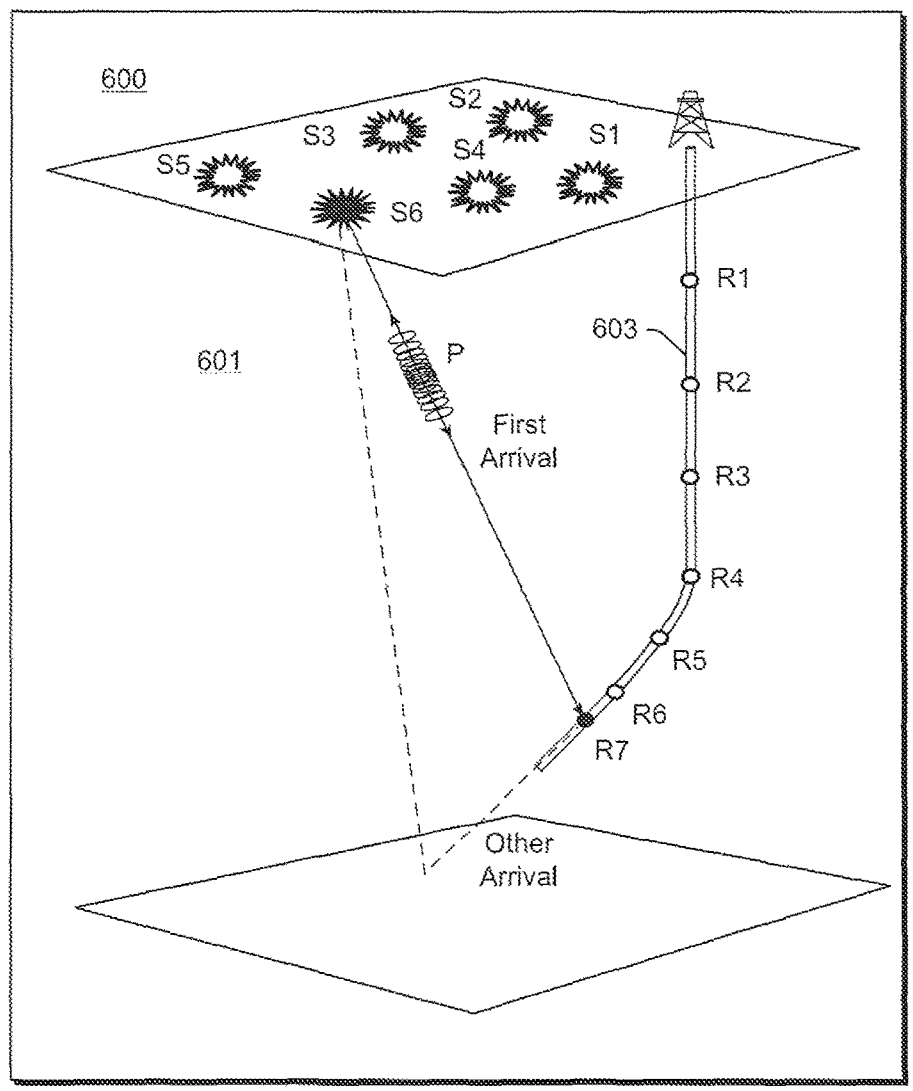
FIG. 6 illustrates an example of a survey and an example of a plot.
Figure 6:
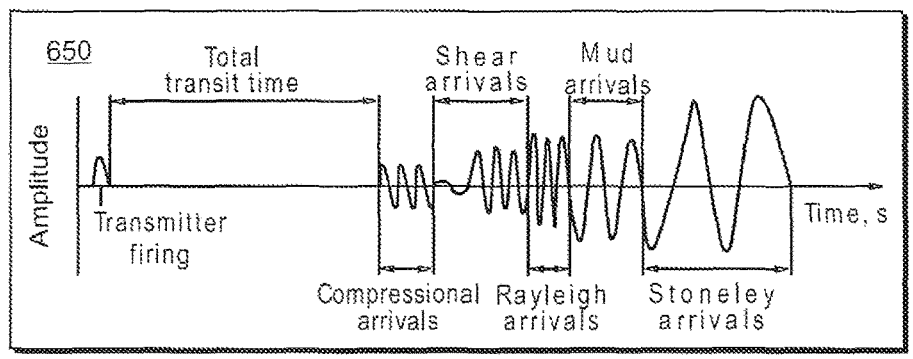

FIG. 6 shows an example of a survey 600 that includes a geologic environment 601 with a borehole 603. The survey 600 includes positioning a receiver at various locations R1 to R7 where, at each of the locations R1 to R7, sources S1 to S6 are actuated (e.g., fired). Thus, in such an example, seismic waveforms may be acquired for each of the locations R1 to R7 that correspond to the plurality of sources S1 to S6. For example, a dataset for the receiver R1 can include data corresponding to the sources S1 to S6, a dataset for the receiver R2 can include data corresponding to the sources S1 to S6, etc.

In the example of FIG. 6, energy that travels in a path from the source S6 to the receiver at the location R7 is labeled "first arrival" (see, e.g., the downgoing direct arrival of the data 180 of FIG. 1). A dashed line in FIG. 6 indicates another arrival, for example, as reflected and upgoing (see, e.g., the upgoing energy of the data 180 of FIG. 1).

FIG. 6 also shows a plot 650 of approximations of amplitude versus time for various types of energy responsive to firing of a transmitter (e.g., a source). As shown in the plot 650, a transit time may be based at least in part on a compressional arrival at a receiver. As an example, a method can include acquiring data and/or analyzing data using a window in time. For example, consider a window that aims to capture a first compressional arrival. In such an example, an analysis may commence after receipt of a first compressional arrival, for example, at the expiration of a capture window. Such a capture window may optionally be set to be short enough to exclude other information (e.g., other arrivals). In such an example, the amount of data for a plurality of source locations with respect to a receiver in a borehole may be reduced, which may, for example, expedite an acquisition process, an analysis process, etc.

As an example, a compressional wave may be characterized as an elastic body wave or sound wave in which particles tend to oscillate in the direction the wave propagates. As an example, a first arrival may be the earliest arrival of energy propagated from an energy source (e.g., at a source location) to a receiver in a borehole (e.g., in a well). As an example, a first arrival may be the first indication of seismic energy on a trace.

As an example, a method can include analyzing the first arrival of direct compressional energy incident on a three component receiver to determine the spatial direction of the incoming energy. In such an example, the compressional arrival can optionally be assumed to be polarized within the vertical plane that includes a source at a particular source location and a receiver that is disposed in a borehole.

As an example, in a transversely homogeneous medium or media, compressional energy may be assumed to be polarized within a source-receiver plane. In such a medium or media, a relative bearing measurement can be, for example, assumed to be independent of subsurface properties. As an example, in case of lateral heterogeneity, a method may include receiving information as to a subsurface velocity field where, for example, the method may include adjusting one or more incident energy arrival angles based at least in part on the subsurface velocity field.

As an example, spatially known source locations, spatial location of the receiver in a borehole trajectory as determined by the deviation survey, and the incident angles of direct compressional energy on the three components of the receiver, can be used to compute orientation of three components within a borehole. Such an orientation, which may be referred to as the relative bearing, can be defined as the relative angular position of the primary horizontal component with the high-side of the borehole, in its cross-sectional plane. Relative bearing determined from multiple source locations would yield an approximately common value where the receiver is stationary and where its spatial location is accurately computed from an existing deviation survey. Errors in a deviation survey can lead to varying relative bearing angles for different sources.

As an example, a method can include varying parameters of a deviation survey and recomputing the relative bearing of a receiver for each combination of deviation survey parameters. As an example, an error function may be defined to be representative of the diversity of relative bearing measurements with source location and may be computed for each set of deviation survey parameters. In such an example, the lowest value of an error function can be taken as corresponding to an optimum combination of deviation survey parameters.

As an example, a method can include utilizing orientation of a three-component seismic receiver, anchored within a borehole, to optimize a deviation survey of the borehole (e.g., a well). In such an example, the three components of the receiver can be orthogonal to each other and fixed with respect to the receiver body. As an example, the vertical component can be aligned with the axis of the receiver and the two orthogonal horizontal components can be aligned in a plane perpendicular to the axis of the receiver.

As an example, when lowered in a borehole, the vertical component of a receiver can be parallel to the borehole (e.g., borehole longitudinal axis) and the horizontal components can be free to rotate in a cross-sectional plane of the borehole. As an example, energy from multiple seismic sources, set off at known spatial locations, can be recorded by such a three-component receiver.

As an example, a method can include performing polarization analysis to spatially construct particle motion represented by one or more acquired waveforms. For example, particle motion measured on the first arrival of compressional energy can be assumed to be in the vertical plane that includes the source and the receiver. As an example, relative angles of incident energy on the three components of a receiver can be used to determine the orientation of the receiver in the borehole.

Becquey and Dubesset, Three-Component Sonde Orientation in a Deviated Well, Geophysics, vol. 55, no. 10 (1990), which is incorporated by reference herein, describes orienting three-component borehole seismic receivers. This orientation, called the relative bearing, is defined as the relative angular position of the receiver's primary horizontal component with respect to the high-side of the borehole. The known spatial position of the source, spatial position of the receiver as computed by an existing deviation survey, and the relative direction of incident energy on the three-component receiver, are used to compute the relative bearing for each source-receiver pair. Data from multiple sources, at different spatial locations, may yield approximately the same relative bearing value for a stationary receiver and an accurate deviation survey. However, errors in the deviation survey can lead to differences in the relative bearing computed from different sources.

Figure 7:
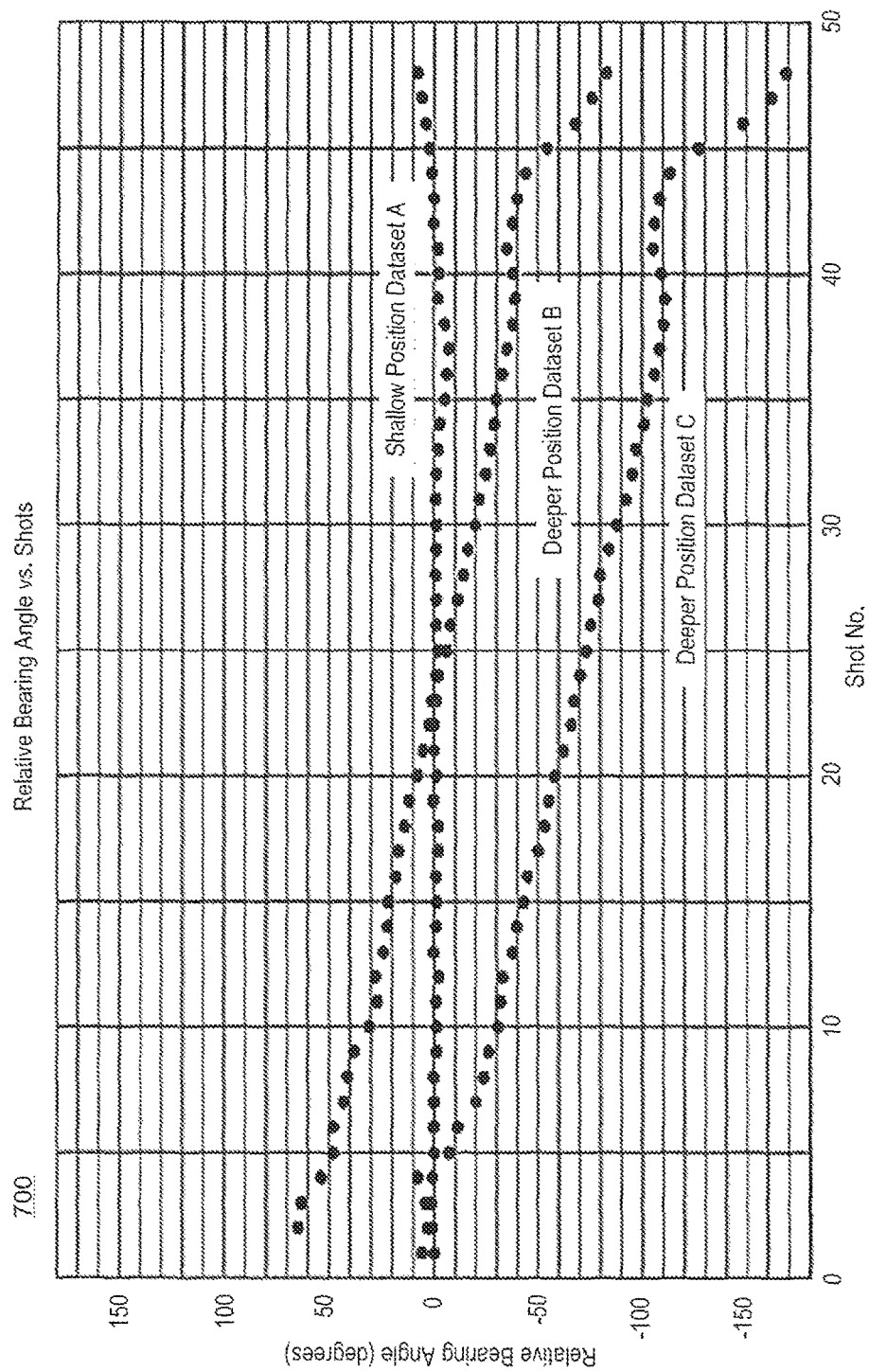
FIG. 7 illustrates an example of a plot of examples of data.

FIG. 7 shows an example of a plot 700 of relative bearing angles determined for three separate receivers from 48 surface source locations. The shallow dataset A corresponds to a relatively shallower receiver located within a relatively accurately assessed part of a deviation survey while the deeper datasets B and C correspond to two deeper receivers located within a relatively inaccurate part of the deviation survey.

As an example, a method can include varying one or more parameters of a deviation survey, for example, along a cone of uncertainty. In such an example, individual sets of survey parameters may be used to compute the relative bearing for an individual receiver. As an example, alternatively, the spatial location of a borehole could be varied to perform an analysis.

As an example, a method can include minimizing an error function. For example, an error function proportional to the dispersion of relative bearing values computed for each set of survey parameters may be minimized to determine the optimum measured depth, inclination, and azimuth for a borehole. As an example, the standard deviation of relative bearing data points may be taken as an error function. Such a method may be repeated over an array of receivers or, for example, by moving a single receiver along a borehole, for example, to optimize at least a portion of a deviation survey (e.g., and compute an accurate borehole trajectory).

As an example, a method can include a minimum of two source positions. For example, consider two of the source locations S1 to S6 of FIG. 6. As an example, accuracy of a resultant trajectory may be directly proportional to the number of source locations utilized. For example, a higher number of source locations can statistically improve accuracy of a relative bearing computation and thereby the accuracy of a computed borehole trajectory. As an example, a method may include a rule such that a source location is not to be aligned to a vertical component of a three-component seismic receiver (e.g., within some angle limits), for example, because low energy on the horizontal components may make a polarization analysis unstable.

As an example, a standard deviation error function may directly quantify accuracy of relative bearing measurement. For example, such error would depend on accuracy of spatial source positioning, linearity of first arrival particle motion, polarization of first arrival within source-receiver plane, and number of source positions used for orientation.

As an example, spatial positioning of one or more surface sources may be surveyed to a desired level of accuracy. As an example, borehole sources lowered in a relatively accurately measured borehole trajectory (e.g., using a method set forth herein) may be located with adequate precision.

As an example, linearity of first arrival particle motion can depend on data quality and a method may include optimizing during a polarization analysis. In a transversely homogeneous medium (e.g., or media), compressional energy can be polarized within a source-receiver plane. In such medium or media, the relative bearing measurement can be independent of subsurface properties. In case of lateral heterogeneity, information as to a subsurface velocity field may be known and incident energy arrival angles adjusted for such an environment.

Figure 8:
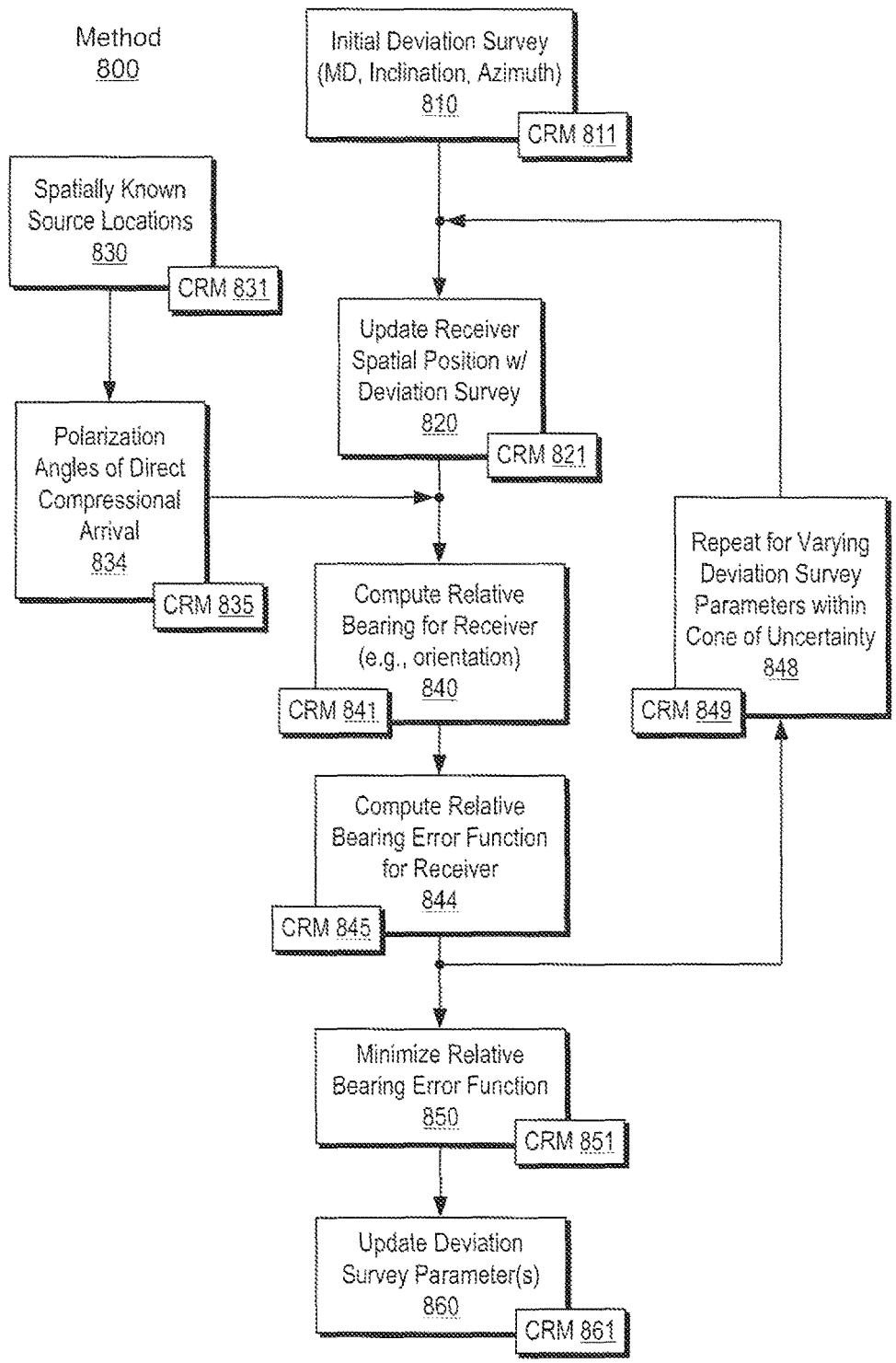
FIG. 8 illustrates an example of a method.

FIG. 8 shows an example of a method 800 that includes a reception block for receiving an initial deviation survey, an update receiver spatial position block 820 with information of a deviation survey, a reception block 830 for receiving spatially known source locations (see, e.g., FIG. 6), a polarization angle block 834 for providing polarization angles of direct compressional arrival (e.g., of compression wave), a computation block 840 for computing relative bearing for a receiver (e.g., computing receiver orientation), a computation block 844 for computing a relative bearing error function for the receiver, a repetition block 848 for repeating various actions for various deviation survey parameters within a cone of uncertainty, a minimization block 850 for minimizing the relative error function, and an update block 860 for updating one or more deviation survey parameters.

The method 800 is shown in FIG. 8 in association with various computer-readable media (CRM) blocks 811, 821, 831, 835, 841, 845, 849, 851, and 861. Such blocks generally include instructions suitable for execution by one or more processors (or cores) to instruct a computing device or system to perform one or more actions. While various blocks are shown, a single medium may be configured with instructions to allow for, at least in part, performance of various actions of the method 800. As an example, a CRM block can be a computer-readable storage medium that is non-transitory, not a carrier wave and not a signal. As an example, such blocks can include instructions that can be stored in memory such as the memory 258 of the system 250 and can be executable by one or more of the processors 256 of the system 250. As an example, a module can include processor-executable instructions that can be executed by one or more processors. As an example, instruction can be stored in memory such as, for example, the memory 428 of the tool 420 of FIG. 4. In such an example, the instructions can be processor-executable instructions that can be executed by one or more processors, which may be circuitry such as the circuitry 426 of the tool 420 of FIG. 4. As an example, a method may optionally be performed in a distributed manner where, for example, a portion of a method is performed using a tool, which can be a downhole tool and where a portion of the method is performed using equipment, which can be surface equipment (e.g., optionally in communication with the tool).

As an example, a method can include receiving an estimated spatial location of a three-component receiver in a borehole (see, e.g., the blocks 810 and 820); receiving a plurality of spatial locations of sources of seismic energy (see, e.g., the block 830); receiving incident angles for the three-component receiver at the estimated spatial location for the plurality of spatial locations of the sources of seismic energy (see, e.g., the block 834); computing orientations for the three-component receiver based at least in part on the incident angles (see, e.g., the block 840); minimizing an error function for the orientations (see, e.g., the block 850); and, based at least in part on the minimizing, determining one or more deviation survey parameter values that specify at least a portion of a trajectory for the borehole (see, e.g., the block 860).

As an example, a method can include computing orientations for a three-component receiver based at least in part on incident angles; minimizing an error function for the orientations; and, based at least in part on the minimizing, determining one or more deviation survey parameter values that specify at least a portion of a trajectory for a borehole. As an example, a method can include receiving orientations for a three-component receiver based at least in part on incident angles; minimizing an error function for the orientations; and, based at least in part on the minimizing, determining one or more deviation survey parameter values that specify at least a portion of a trajectory for a borehole.

As an example, a method can include receiving a deviation survey, for example, as acquired by measurement while drilling (MWD) or via a gyro survey. As an example, parameters of the deviation survey can include one or more of measured depth (MD), inclination, azimuth and an uncertainty model.

As an example, a method can include receiving spatial locations of sources. For example, a relatively precise spatial location of each source can be received. As an example, consider the following parameters as being sufficient to define source position for sources to be used in an analysis: Source Position X; Source Position Y; and Source Position Z.

As an example, a method can include receiving downhole three-component seismic data and a receiver's measured depth. For example, consider a method that includes receiving: X component waveform, Y component waveform, Z component waveform and receiver MD.

As an example, a method can include using a deviation survey to compute the spatial location of a receiver. Such a method can include analyzing three-component waveforms to determine the polarization angle of incident energy in an X-Y component plane and elevation angle from the X-Y plane towards the Z component. Such an analysis can be performed for each source-receiver pair.

As an example, source position, receiver position, and polarization angles can be used to determine receiver orientation for each receiver position in a borehole. Becquey and Dubesset (1990) describe an example of a technique of orienting three-component borehole seismic receivers. As an example, one or more techniques of U.S. Pat. No. 8,154,951 ('951 patent) may be utilized, which is incorporated by reference herein, entitled Model-based relative bearing estimation of three-component receivers, to Armstrong and assigned to Schlumberger Technology Corporation. The '951 patent describes a method for more accurately determining the relative bearing angle of a directional receiver in a borehole using an existing three-dimensional (3D) geological model, one or more seismic sources and a three component (3C) directional receiver. For example, a method can include receiving direct compressional arrivals generated by multiple source events at the directional receiver disposed in the borehole; rotating the seismic data into the true earth frame using an estimated relative bearing angle; measuring a polarization vector of the rotated seismic data; estimating an incident ray vector of the direct compressional arrivals at the directional receiver using ray-tracing through the 3D model; calculating the weighted sum of an angular difference between the polarization vector and the incident ray vector; and adjusting the estimated relative bearing angle until the angular difference between the polarization and incident ray vectors is minimized.

As an example, a method can include computing the relative bearing error function for one or more receivers. Such a method may use, for example, standard deviation of the relative bearing values for each receiver as the error function. As an example, standard deviation may quantify error in relative bearing.

As an example, a method can include repeating various actions, for example, for various combinations of deviation survey parameters within a cone of uncertainty.

As an example, a method can include to minimize an error function to determine one or more deviation survey parameters, for example, with greater accuracy than those of an initial survey (e.g., MWD, gyro, etc.).

As an example, a system that includes at least a portion for implementation downhole may be utilized to acquire data and, for example, to compute an optimum deviation survey while drilling. For example, given a deviation survey, a system may refine the survey while drilling, which may, for example, include acquiring data during "silent" periods where rotation of a drill bit is halted. For example, consider acquiring data via one or more downhole receivers while firing one or more sources (e.g., with associated different source locations, etc.) during a period where a downhole drill bit is relatively stationary. In such an example, at least a portion of the data may be analyzed (e.g., to refine a deviation survey, extend a deviation survey, etc.) and, for example, used to guide the downhole drill bit (e.g., to direct the downhole drill bit in a planned direction, a desired direction, etc.).

As an example, a system may include one or more modules, which may be provided to analyze data, control a process, perform a task, perform a workstep, perform a workflow, etc.

As an example, a method can include computing an estimated spatial location of a three-component receiver in a borehole; acquiring seismic data from a plurality of spatial locations of sources of seismic energy; determining incident angles for the three-component receiver at the estimated spatial location for the plurality of spatial locations of the sources of seismic energy; computing orientations for the three-component receiver based at least in part on the incident angles; minimizing an error function for the orientations; and, based at least in part on the minimizing, determining one or more deviation survey parameter values that specify at least a portion of a trajectory for the borehole.

As an example, a method can include receiving a predetermined estimated spatial location of a three-component receiver in a borehole; receiving a predetermined plurality of spatial locations of sources of seismic energy; receiving predetermined incident angles for the three-component receiver at the estimated spatial location for the plurality of spatial locations of the sources of seismic energy. Such predetermined information may be used, for example, for computing orientations for the three-component receiver based at least in part on the predetermined incident angles; minimizing an error function for the orientations; and, based at least in part on the minimizing, determining one or more deviation survey parameter values that specify at least a portion of a trajectory for the borehole.

As an example, a method can include receiving an estimated spatial location of a three-component receiver in a borehole; receiving a plurality of spatial locations of sources of seismic energy; receiving incident angles for the three-component receiver at the estimated spatial location for the plurality of spatial locations of the sources of seismic energy; computing orientations for the three-component receiver based at least in part on the incident angles; minimizing an error function for the orientations; and, based at least in part on the minimizing, determining one or more deviation survey parameter values that specify at least a portion of a trajectory for the borehole. In such an example, the method may include estimating the spatial location of the three-component receiver in the borehole based at least in part on a deviation survey, for example, consider a deviation survey that is based on a measurement while drilling technique and/or a gyroscopic technique.

As an example, a method can include updating a deviation survey based at least in part on determining one or more deviation survey parameter values. Such a method may be a refinement method that refines an initial deviation survey, a refined version of an initial deviation survey, etc. Such a method may be an iterative method, for example, where refinements are made successively as data may be acquired via one or more receivers (e.g., three-component receivers) disposed in a borehole.

As an example, a deviation survey can include at least one or more of a measured depth parameter, an inclination parameter, and an azimuth parameter. As an example, a deviation survey may include these three parameters.

As an example, a deviation survey can include an uncertainty model.

As an example, a plurality of spatial locations of sources of seismic energy can include ground locations and/or sea locations.

As an example, a method can include computing incident angles based at least in part on a plurality of compressional energy waveforms acquired via a three-component receiver. For example, consider compressional energy waveforms that include first direct arrival waveforms.

As an example, incident angles can correspond to a measured depth of a three-component receiver in the borehole.

As an example, a method can include minimizing an error function by at least in part computing a standard deviation of orientations.

As an example, a plurality of spatial locations of sources of seismic energy can include at least two different spatial locations.

As an example, a method can include computing polarization angles for a three-component receiver at an estimated spatial location for a plurality of spatial locations of sources of seismic energy.

As an example, a method can include computing elevation angles for a three-component receiver at an estimated spatial location for a plurality of spatial locations of sources of seismic energy.

As an example, an error function can represent a diversity of orientations with respect to spatial locations of sources of seismic energy for a corresponding set of deviation survey parameter values. In such an example, a lowest value of the error function can correspond to an optimum combination of deviation survey parameter values.

As an example, a system can include a processor; memory operatively coupled to the processor; and processor-executable instructions stored in the memory to instruct the system to: receive an estimated spatial location of a three-component receiver in a borehole; receive a plurality of spatial locations of sources of seismic energy; receive incident angles for the three-component receiver at the estimated spatial location for the plurality of spatial locations of the sources of seismic energy; compute orientations for the three-component receiver based at least in part on the incident angles; minimize an error function for the orientations; and, based at least in part on a minimized error function, determine one or more deviation survey parameter values that specify at least a portion of a trajectory for the borehole. As an example, such a system can include processor-executable instructions stored in the memory to instruct the system to perform one or more methods, workflows, etc.

As an example, one or more computer-readable storage media can include processor-executable instructions to instruct a computing system to: receive an estimated spatial location of a three-component receiver in a borehole; receive a plurality of spatial locations of sources of seismic energy; receive incident angles for the three-component receiver at the estimated spatial location for the plurality of spatial locations of the sources of seismic energy; compute orientations for the three-component receiver based at least in part on the incident angles; minimize an error function for the orientations; and, based at least in part on a minimized error function, determine one or more deviation survey parameter values that specify at least a portion of a trajectory for the borehole. As an example, such one or more computer-readable storage media can optionally include processor-executable instructions to instruct a computing system to perform one or more methods, workflows, etc.

Figure 9:
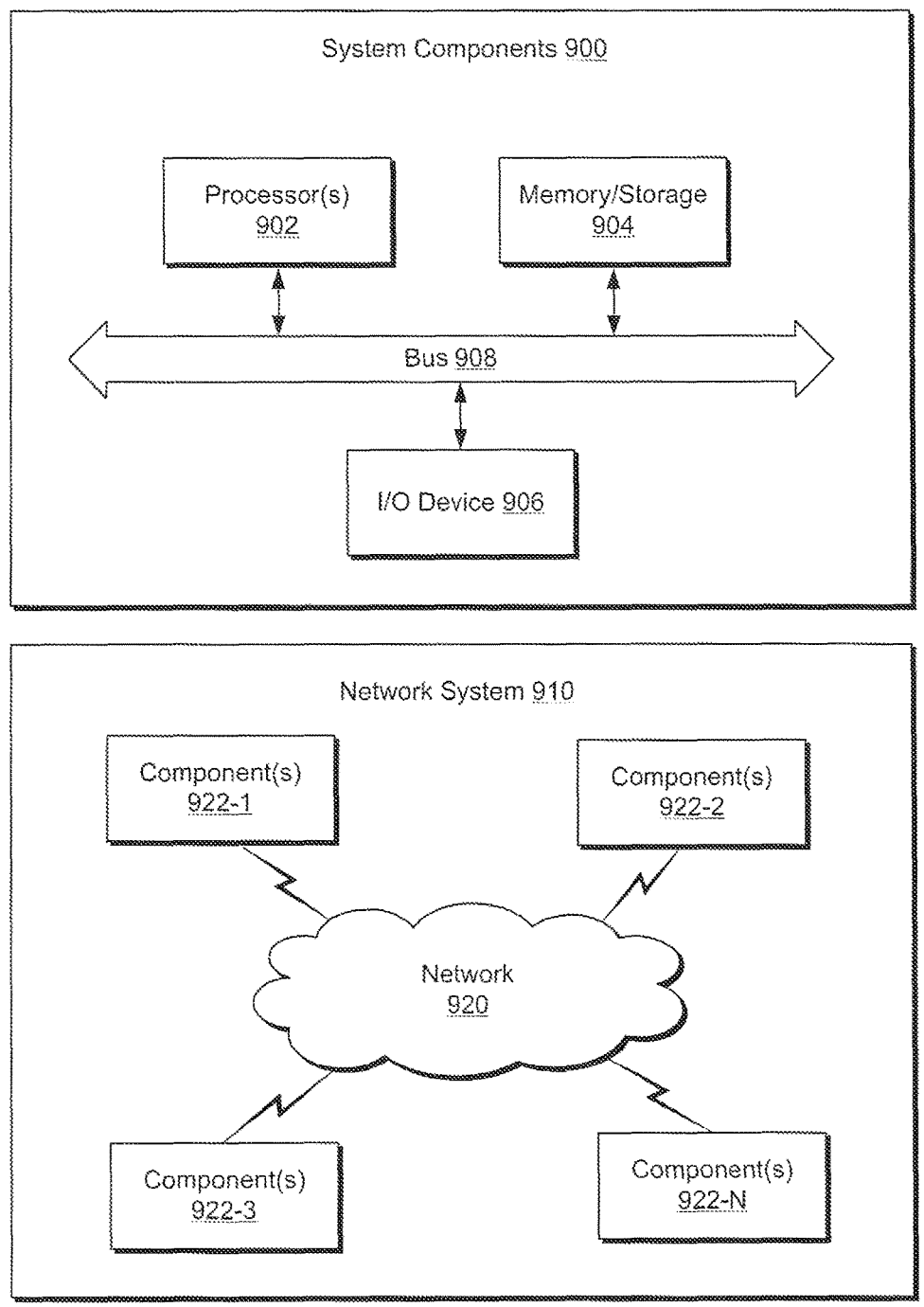
FIG. 9 illustrates example components of a system and a networked system.

FIG. 9 shows components of an example of a computing system 900 and an example of a networked system 910. The system 900 includes one or more processors 902, memory and/or storage components 904, one or more input and/or output devices 906 and a bus 908. In an example embodiment, instructions may be stored in one or more computer-readable media (e.g., memory/storage components 904). Such instructions may be read by one or more processors (e.g., the processor(s) 902) via a communication bus (e.g., the bus 908), which may be wired or wireless. The one or more processors may execute such instructions to implement (wholly or in part) one or more attributes (e.g., as part of a method). A user may view output from and interact with a process via an I/O device (e.g., the device 906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 910. The network system 910 includes components 922-1, 922-2, 922-3, . . . 922-N. For example, the components 922-1 may include the processor(s) 902 while the component(s) 922-3 may include memory accessible by the processor(s) 902. Further, the component(s) 922-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    receiving an estimated spatial location of a three-component receiver in a borehole;
    receiving a plurality of spatial locations of sources of seismic energy;
    receiving incident angles for the three-component receiver at the estimated spatial location for the plurality of spatial locations of the sources of seismic energy;
    computing orientations for the three-component receiver based at least in part on the incident angles;
    minimizing an error function for the orientations; and based at least in part on the minimizing, determining one or more deviation survey parameter values that specify at least a portion of a trajectory for the borehole.

2. The method of claim 1 comprising estimating the spatial location of the three-component receiver in the borehole based at least in part on a deviation survey.

3. The method of claim 2 wherein the deviation survey is based on a measurement while drilling technique, a gyroscopic technique or a measurement while drilling technique, a gyroscopic technique.

4. The method of claim 2 comprising updating the deviation survey based at least in part on the determining one or more deviation survey parameter values.

5. The method of claim 2 wherein the deviation survey comprises a measured depth parameter, an inclination parameter, and an azimuth parameter.

6. The method of claim 2 wherein the deviation survey comprises an uncertainty model.

7. The method of claim 1 wherein the plurality of spatial locations of the sources of seismic energy comprise ground locations and/or sea locations.

8. The method of claim 1 comprising computing the incident angles based at least in part on a plurality of compressional energy waveforms acquired via the three-component receiver.

9. The method of claim 8 wherein the compressional energy waveforms comprise first direct arrival waveforms.

10. The method of claim 1 wherein the incident angles correspond to a measured depth of the three-component receiver in the borehole.

11. The method of claim 1 wherein the minimizing an error function comprises computing a standard deviation of the orientations.

12. The method of claim 1 wherein the plurality of spatial locations of the sources of seismic energy comprise at least two different spatial locations.

13. The method of claim 1 comprising computing polarization angles for the three-component receiver at the estimated spatial location for the plurality of spatial locations of the sources of seismic energy.

14. The method of claim 1 comprising computing elevation angles for the three-component receiver at the estimated spatial location for the plurality of spatial locations of the sources of seismic energy.

15. The method of claim 1 wherein the error function represents a diversity of orientations with respect to spatial locations of sources of seismic energy for a corresponding set of deviation survey parameter values.

16. The method of claim 15 wherein the lowest value of the error function corresponds to an optimum combination of deviation survey parameter values.

17. A system comprising:
a processor;
memory operatively coupled to the processor; and
processor-executable instructions stored in the memory to instruct the system to:
receive an estimated spatial location of a three-component receiver in a borehole;
receive a plurality of spatial locations of sources of seismic energy;
receive incident angles for the three-component receiver at the estimated spatial location for the plurality of spatial locations of the sources of seismic energy;
compute orientations for the three-component receiver based at least in part on the incident angles;
minimize an error function for the orientations; and
based at least in part on a minimized error function, determine one or more deviation survey parameter values that specify at least a portion of a trajectory for the borehole.

18. One or more computer-readable storage media comprising processor-executable instructions to instruct a computing system to:
receive an estimated spatial location of a three-component receiver in a borehole;
receive a plurality of spatial locations of sources of seismic energy;
receive incident angles for the three-component receiver at the estimated spatial location for the plurality of spatial locations of the sources of seismic energy;
compute orientations for the three-component receiver based at least in part on the incident angles;
minimize an error function for the orientations; and
based at least in part on a minimized error function, determine one or more deviation survey parameter values that specify at least a portion of a trajectory for the borehole.

* * * * *